United States Patent [19]

Light et al.

[11] 4,263,183

[45] Apr. 21, 1981

[54] CELLULOSE ESTER/COPOLYACRYLATE COMPOSITION

[75] Inventors: Ronald R. Light; John R. Dombroski; Hawkins, James M., all of Kingsport, Tenn.

[73] Assignee: Eastman Kodak Company, Rochester, N.Y.

[21] Appl. No.: 89,715

[22] Filed: Oct. 31, 1979

[51] Int. Cl.$^3$ ................................................ C08L 1/14
[52] U.S. Cl. .................................................... 260/17 R
[58] Field of Search ...................................... 260/17 R

[56] References Cited

U.S. PATENT DOCUMENTS

| | | | |
|---|---|---|---|
| 3,809,667 | 5/1974 | Coaker et al. | 260/31.8 R |
| 3,948,674 | 4/1976 | Coaker et al. | 260/17 R |

FOREIGN PATENT DOCUMENTS 923645  3/1973  Canada ................................ 260/17 R

*Primary Examiner*—Edward M. Woodberry
*Attorney, Agent, or Firm*—Malcolm G. Dunn; Daniel B. Reece III

[57] ABSTRACT

Blended composition of cellulose ester and a copolyacrylate having improved notched Izod impact strength and excellent visual clarity; the cellulose ester being selected from cellulose acetate butyrate and cellulose acetate propionate; and the copolyacrylate including about 5 to about 20 parts per hundred parts resin of a copolymer containing about 45 to about 55% by weight butyl acrylate and about 55 to about 45% by weight methyl acrylate.

9 Claims, No Drawings

CELLULOSE ESTER/COPOLYACRYLATE COMPOSITION

BACKGROUND OF THE INVENTION

The present invention is directed to a cellulose ester/copolyacrylate blended composition having improved notched Izod impact strength and excellent clarity as compared to the cellulose ester composition by itself when formed into recreational vehicle windows, skylights, automotive taillights, camera and flashlight lenses, and when applied in other areas where the combination of clarity and toughness is needed.

Monomeric plasticized cellulose ester compositions such as cellulose acetate butyrate having a butyryl content of about 38%, about one free hyroxyl group for each four anhydroglucose units and a falling ball viscosity of 20 seconds (in accordance with the procedure described in ASTM D-817-65 Formula A- and D-1343-56), for example, have been shown to become brittle after a period of time of being exposed to fluctuations of temperature and environment such as that experienced in many applications (automotive parts, for example).

The above-mentioned embrittlement has been attributed to the exudation and loss of the plasticizer from the plastic over a period of time. One method for eliminating the problem of exudation is the use of a polymeric plasticizer which will not exude from the cellulose ester plastic under these conditions. Although polymeric plasticized cellulose acetate butyrate plastics having excellent clarity and very low exudation are known, such compositions do not possess the required toughness.

It was therefore totally unexpected to discover that the addition of a copolyacrylate such as poly[(50) butyl-co-(50) methyl acrylate] to a cellulose ester such as cellulose acetate butyrate would result in the combination of excellent clarity and improved notched Izod impact strength. It was also unexpected in view of the fact that other butyl acrylate/methyl acrylate copolymers with a methyl acrylate content less than 45% or greater than 55% by weight were not found to possess this combination of properties.

An object of the invention, therefore, is to provide a cellulose ester composition, which when formed into recreational vehicle windows, skylights, automotive taillights, camera and flashlight lenses and the like, will have excellent clarity and improved toughness without deleteriously affecting other mechanical properties.

From the disclosure to follow other objects of the invention will become apparent to those skilled in the art to which this invention pertains.

SUMMARY OF THE INVENTION

The invention is directed to a composition having improved notched Izod impact strength and improved clarity, the composition concerning a blend of a cellulose ester and a copolyacrylate.

The cellulose ester may be selected from cellulose acetate butyrate containing from about 25 to about 55% by weight butyryl, having a hydroxyl content from about 0.5 to about 3% by weight, and having a falling ball viscosity from about 5 to about 20 seconds; and from cellulose acetate propionate containing from about 43 to about 52% by weight propionyl, having a hydroxyl content from about 0.5 to about 3% by weight, and having a falling ball viscosity from about 5 to about 20 seconds.

The copolyacrylate may comprise about 5 to about 20 parts per hundred parts resin of a copolymer containing about 45 to about 55% by weight butyl acrylate and about 55 to about 45% by weight methyl acrylate, the copolymer having a glass transition temperature of from about $-15°$ to about $-25°$ C. and an inherent viscosity ranging from about 1.0 to about 4.0. Inherent viscosity for the copolyacrylate is determined by a concentration of 0.25% of the copolymer in a solvent (dimethyl formamide), the copolymer being dissolved and then measured at 25° C.

More specifically the cellulose ester may be selected from cellulose acetate butyrate containing about 38% by weight butyryl, having a hydroxyl content of about 1.5% by weight, and having a falling ball viscosity of about 20 seconds, and the copolymer may contain about 50% by weight butyl acrylate and about 50% by weight methyl acrylate; and preferably the cellulose acetate butyrate contains about 38% by weight butyryl, having a hydroxyl content of about 1.5%, and having a falling ball viscosity of about 20 seconds, and the copolymer may contain about 45% by weight butyl acrylate and about 55% by weight methyl acrylate.

More specifically also, the cellulose ester may be selected from cellulose acetate propionate containing about 48% by weight propionyl, having a hydroxyl content of about 2% by weight, and having a falling ball viscosity of about 20 seconds, and the copolymer may contain about 50% by weight butyl acrylate and about 50% by weight methyl acrylate; and preferably the cellulose acetate propionate contains about 48% by weight propionyl, having a hydroxyl content of about 2% by weight, and having a falling ball viscosity of about 20 seconds, and the copolymer may contain about 45% by weight butyl acrylate and about 55% by weight methyl acrylate.

The blend of the cellulose ester and copolyacrylate may preferably comprise about 10 to about 15 parts per hundred parts resin of the copolyacrylate.

The improved notched Izod impact strength of the blended composition appears to extend from about 2.4 to about 3.2 foot-pounds per inch.

DESCRIPTION OF THE PREFERRED EMBODIMENT

The invention, therefore, involves a blend of a copolyacrylate and a cellulose ester such as cellulose acetate butyrate or cellulose acetate propionate. The copolyacrylate found to be useful in this invention is identified as poly[(50) butyl acrylate-co-(50) methyl acrylate], which is compatible with the cellulose ester herein disclosed.

The copolyacrylate is compounded into the cellulose acetate butyrate by normal techniques, such as by roll milling or Banbury mixing, at levels of about 5 to about 20 parts per hundred parts resin.

This invention may be illustrated by the following examples although it will be understood that these examples are included merely for purposes of illustration and are not intended to limit the scope of the invention.

EXAMPLE A

In reference to Table 1, a control sample of unplasticized (i.e. containing no monomeric plasticizers) cellulose acetate butyrate was prepared, compounded on a roll mill, and then molded. Although the visual clarity was clear, the notched Izod impact strength was low (about 1.8 foot-pounds per inch).

EXAMPLE 1

Ten parts per hundred parts resin (10 phr) poly[(50) methyl acrylate-co-(50) butyl acrylate] was compounded into a cellulose acetate butyrate (CAB) (about 38% by weight butyryl content, about 1.5% by weight hydroxyl content, and 20 seconds falling ball viscosity [as per ASTM D-817-65 (Formula A) and D-1343-56]) by compounding on a roll mill and injection molding. The comparison of the data from Example 1 with the data from Example A, the control example, demonstrates the surprising combination of clarity and increase in the notched Izod impact strength (i.e. coming within the range of about 2.4 to about 3.2 foot-pounds per inch) when a portion of the cellulose acetate butyrate is replaced with poly[(50) methyl acrylate-co-(50) butyl acrylate].

EXAMPLE 2

Ten parts per hundred parts resin (10 phr) poly[(55) methyl acrylate-co-(45) butyl acrylate] was compounded on a roll mill into the cellulose acetate butyrate of Example 1 and injection molded. The visual clarity was clear and the notched Izod impact strength was high.

EXAMPLE 3

Ten parts per hundred parts resin (10 phr) poly[(55) butyl acrylate-co-(45) methyl acrylate] was compounded on a roll mill into the cellulose acetate butyrate of Example 1 and injection molded. The visual clarity was also clear and the notched Izod impact strength was also high.

EXAMPLE 4

Ten parts per hundred parts resin (10 phr) poly[(60) methyl acrylate-co-(40) butyl acrylate] was similarly compounded as in Example 1 and then injection molded. Although the visual clarity of the sample was clear, the notched Izod impact strength was low.

EXAMPLE 5

Ten parts per hundred parts resin (10 phr) poly[(60) butyl acrylate-co-(40) methyl acrylate] was similarly compounded and injection molded as in Example 1. This time the visual clarity was hazy although the notched Izod impact strength was high, i.e. within the range of from about 2.4 to about 3.2 foot-pounds per inch.

EXAMPLE 6

Ten parts per hundred parts resin (10 phr) poly[(70) methyl acrylate-co-(30) butyl acrylate] was similarly processed as in Example 1. The visual clarity of the sample was clear but the notched Izod impact strength was low.

EXAMPLE 7

Ten parts per hundred parts resin (10 phr) poly[(70) butyl acrylate-co-(30) methyl acrylate] was similarly processed as in Example 1. The visual clarity of the sample was hazy, although the notched Izod impact strength was significantly high.

EXAMPLE 8

Ten parts per hundred parts resin (10 phr) poly[(75) methyl acrylate-co-(25) butyl acrylate] was similarly processed as in Example 1. The visual clarity of the sample was clear but the notched Izod impact strength was low.

EXAMPLE 9

Ten parts per hundred parts resin (10 phr) poly[(75) butyl acrylate-co-(25) methyl acrylate] was similarly processed as in Example 1. The visual clarity of the sample was hazy although the notched Izod impact strength was high.

By further comparison with the examples given above when 10 parts per hundred parts resin (10 phr) poly(butyl acrylate) (not shown in Table 1) were compounded into the cellulose acetate butyrate of Example 1, the resulting injection molded sample had a hazy visual clarity and showed only a slight increase in impact strength (about 2.2 foot-pounds per inch), thus verifying the surprising results in combination of visual clarity and toughness obtained when poly[(50) methyl acrylate-co-(50) butyl acrylate], for instance, is added to cellulose acetate butyrate.

By still further comparison with Examples 1 to 9, when ten parts per hundred parts resin (10 phr) poly(methyl acrylate) (not shown in Table 1) were compounded into the cellulose acetate butyrate of Example 1, the resulting injection molded sample had a hazy visual clarity and a very low notched Izod impact strength (about 0.6 foot-pounds per inch), which further demonstrates the surprising combination of visual clarity and toughness obtained when 10 phr poly[(50) methyl acrylate-co-(50) butyl acrylate] is added to the cellulose acetate butyrate of Example 1.

TABLE 1

| | Cellulose Acetate Butyrate Containing Copolymers of Methyl and Butyl Acrylates | | | |
|---|---|---|---|---|
| Examples | Copolyacrylate | Concentration phr | Clarity (visual) | Notched Izod Impact 23° C. ft.-lb./in. |
| A | None (control) | | clear | 1.8 |
| 1 | 50/50 methyl acrylate/ butyl acrylate | 10 | clear | 3.2 |
| 2 | 55/45 methyl acrylate/ butyl acrylate | 10 | clear | 2.8 |
| 3 | 55/45 butyl acrylate/ methyl acrylate | 10 | clear | 2.4 |
| 4 | 60/40 methyl acrylate/ butyl acrylate | 10 | clear | 1.5 |
| 5 | 60/40 butyl acrylate/ methyl acrylate | 10 | hazy | 3.0 |
| 6 | 70/30 methyl acrylate/ butyl acrylate | 10 | clear | 1.7 |
| 7 | 70/30 butyl acrylate/ methyl acrylate | 10 | hazy | 3.2 |
| 8 | 75/25 methyl acrylate/ butyl acrylate | 10 | clear | 1.7 |
| 9 | 75/25 butyl acrylate/ methyl acrylate | 10 | hazy | 2.9 |

PERMISSIBLE VARIATIONS

As may be noted from Table 1 above, the concentration of methyl acrylate and butyl acrylate in the methyl acrylate/butyl acrylate copolymer may range between about 45 and about 55% by weight but preferably about 50% by weight.

With reference to Table 2 below, Examples 10-14, it may be noted that the concentration of poly[(50) methyl acrylate-co-(50) butyl acrylate] added to the cellulose acetate butyrate of Example 1 may vary between about 5 phr and about 20 phr but preferably about 10 to about 15 phr. It may also be noted from Table 2 that when the copolymer concentration is increased to 25 phr (Example 14), the visual clarity is hazy even though the notched Izod impact strength has increased significantly to about 4.7 foot-pounds per inch.

In addition, stabilizers, ultra-violet inhibitors and other plasticizers which do not unduly affect the desired characteristics of the finished products may also be used.

TABLE 2
Cellulose Acetate Butyrate Containing
Poly[(50) methyl acrylate-co-(50) butyl acrylate]

| Examples | Concentration of Copolyacrylate phr | Clarity (visual) | Notched Izod Impact 23° C. ft.-lb./in. |
|---|---|---|---|
| 10 | 5 | clear | 2.4 |
| 11 | 10 | clear | 3.2 |
| 12 | 15 | clear | 2.9 |
| 13 | 20 | clear | 2.7 |
| 14 | 25 | hazy | 4.7 |

The inherent viscosity of the poly[(50) methyl acrylate-co-(50) butyl acrylate] may be in the range of about 1.0 to about 4.0 as determined by a concentration of 0.25% of the copolymer in a solvent (dimethyl formamide), the copolymer being dissolved and then measured at 25° C.

The cellulose acetate butyrate may have a butyryl content of about 25 to about 55% by weight but preferably about 38% by weight; a hydroxyl content of about 0.5 to about 3% by weight but preferably about 1.5% by weight; and a falling ball viscosity of about 5 to about 20 seconds but preferably about 20 seconds. The butyryl and hydroxyl contents are determined in accordance with the procedure in ASTM D-817-65. The falling ball viscosity is determined in accordance with the procedure in ASTM D-817-65 (Formula A) and D-1343-56.

EXAMPLE B

In reference to Table 3, a control sample of unplasticized (i.e containing no monomeric plasticizers) cellulose acetate propionate was prepared, compounded on a roll mill, and then molded. Although the visual clarity was clear the notched Izod impact strength was low (about 1.3 foot-pounds per inch).

EXAMPLE 15

Ten parts per hundred parts resin (10 phr) poly[(50) methyl acrylate-co-(50) butyl acrylate] was compounded into a cellulose acetate propionate (CAP) about 48% by weight propionyl, having a hydroxyl content of about 2% by weight, and having a falling ball viscosity of about 20 seconds [as per ASTM D-817-65 (Formula A) and D-1343-56]) by compounding on a roll mill and injection molding. The comparison of the data from Example 15 with the data from Example B, the control example, demonstrates the surprising combination of clarity and increase in the notched Izod impact strength (i.e. coming within the range of about 2.4 to about 3.2 foot-pounds per inch) when a portion of the cellulose acetate propionate is replaced with poly[(50) methyl acrylate-co-(50) butyl acrylate].

EXAMPLE 16

Ten parts per hundred parts resin (10 phr) poly[(55) methyl acrylate-co-(45) butyl acrylate] was compounded on a roll mill into the cellulose acetate propionate of Example 15 and injection molded. The visual clarity was clear and the notched Izod impact strength was high.

EXAMPLE 17

Ten parts per hundred parts resin (10 phr) poly[(55) butyl acrylate-co-(45) methyl acrylate] was processed as in Example 15. The visual clarity was clear and the notched Izod impact strength was high.

EXAMPLE 18

Ten parts per hundred parts resin (10 phr) poly[(75) methyl acrylate-co-(25) butyl acrylate] was processed as in Example 15. Although the visual clarity was clear the notched Izod impact strength was low.

EXAMPLE 19

Ten parts per hundred parts resin (10 phr) poly[(75) butyl acrylate-co-(25) methyl acrylate] was processed as in Example 15. The visual clarity this time was hazy even though the notched Izod impact strength was high.

TABLE 3
Cellulose Acetate Propionate Containing
Copolymers of Methyl and Butyl Acrylate

| Examples | Copolyacrylate | Concentration phr | Clarity (visual) | Notched Izod Impact 23° C. ft.-lb./in. |
|---|---|---|---|---|
| B | None (control) | | clear | 1.3 |
| 15 | 50/50 methyl acrylate/ butyl acrylate | 10 | clear | 2.8 |
| 16 | 55/45 methyl acrylate/ butyl acrylate | 10 | clear | 2.8 |
| 17 | 55/45 butyl acrylate/ methyl acrylate | 10 | clear | 3.0 |
| 18 | 75/25 methyl acrylate/ butyl acrylate | 10 | clear | 1.5 |
| 19 | 75/25 butyl acrylate/ methyl acrylate | 10 | hazy | 3.0 |

PERMISSIBLE VARIATIONS

As may be noted from Table 3 above, the concentration of methyl acrylate and butyl acrylate in the methyl acrylate/butyl acrylate copolymer may also for cellulose acetate propionate range between about 45 and about 55% by weight but preferably about 50% by weight.

In reference to Table 4 below, Examples 20-24, it may be noted that the concentration of poly[(50) methyl acrylate-co-(50) butyl acrylate] added to the cellulose acetate propionate of Example 15 may vary between about 5 phr and about 20 phr but preferably about 10 to about 15 phr. It may also be noted from Table 4 that when the copolymer concentration is increased to 25 phr (Example 24), the visual clarity is hazy even though the notched Izod impact strength has increased significantly to about 5.0 foot-pounds per inch.

In addition, stabilizers, ultra-violet inhibitors and other plasticizers which do not unduly affect the desired characteristics of the finished product may also be used.

TABLE 4

Cellulose Acetate Propionate Containing
Poly[(50) methyl acrylate-co-(50) butyl acrylate]

| Examples | Concentration of Copolyacrylate phr | Clarity (visual) | Notched Izod Impact 23° C. ft.-lb./in. |
|---|---|---|---|
| 20 | 5 | clear | 2.5 |
| 21 | 10 | clear | 2.8 |
| 22 | 15 | clear | 3.2 |
| 23 | 20 | clear | 3.0 |
| 24 | 25 | hazy | 5.0 |

The inherent viscosity of the poly[(50) methyl acrylate-co-(50) butyl acrylate], when working with cellulose acetate propionate, may also be in the range of about 1.0 to about 4.0 as determined by a concentration of 0.25% of the copolymer in a solvent (dimethyl formamide), the copolymer being dissolved and then measured at 25° C.

The cellulose acetate propionate may have a propionyl content of about 43 to about 52% by weight but preferably about 48% by weight, a hydroxyl content of about 0.5 to about 3% by weight but preferably about 2% by weight, and a falling ball viscosity of about 5 to about 20 seconds but preferably about 20 seconds. The propionyl and hydroxyl contents are determined in accordance with the procedure in ASTM D-817-65. The falling ball viscosity is determined in accordance with the procedure in ASTM D-817-65 (Formula A) and D-1343-56.

APPLICATIONS

It has been found that the unexpected combination of visual clarity and toughness will make the above-described blends useful for overfoil extrusions such as automobile drip rails, recreational vehicle skylights and automotive taillight lens applications, to mention only a few of the possible applications. All of this is accomplished without deleteriously affecting other mechanical properties.

The invention has been described in detail with particular reference to preferred embodiments thereof, but it will be understood that variations and modifications can be effected within the spirit and scope of the invention.

We claim:

1. A composition having improved notched Izod impact strength and improved clarity, said composition comprising a blend of a cellulose ester selected from cellulose acetate butyrate containing from about 25 to about 55% by weight butyryl, having a hydroxyl content from about 0.5 to about 3% by weight, and having a falling ball viscosity from about 5 to about 20 seconds; and from cellulose acetate propionate containing from about 43 to about 52% by weight propionyl, having a hydroxyl content from about 0.5 to about 3% by weight, and having a falling ball viscosity from about 5 to about 20 seconds; and about 5 to about 20 parts per hundred parts resin of a copolymer containing about 45 to 55% by weight butyl acrylate and about 55 to 45% by weight methyl acrylate, said copolymer having a glass transition temperature of from about $-15°$ to $-25°$ C. and a range of inherent viscosity from about 1.0 to about 4.0, said inherent viscosity being determined by a concentration of 0.25% of the copolymer in a solvent (dimethyl formamide), the copolymer being dissolved and then measured at 25° C.

2. A composition as defined in claim 1 wherein said cellulose ester is cellulose acetate butyrate containing about 38% by weight butyryl, having a hydroxyl content of about 1.5% by weight, and having a falling ball viscosity of about 20 seconds, and said copolymer contains about 50% by weight butyl acrylate and about 50% by weight methyl acrylate.

3. A composition as defined in claim 1 wherein said cellulose ester is cellulose acetate butyrate containing about 38% by weight butyryl, having a hydroxyl content of about 1.5% by weight, and having a falling ball viscosity of about 20 seconds, and said copolymer contains about 45% by weight butyl acrylate and about 55% by weight methyl acrylate.

4. A composition as defined in claim 1 wherein said cellulose ester is cellulose acetate propionate containing about 48% by weight propionyl, having a hydroxyl content of about 2% by weight, and having a falling ball viscosity of about 20 seconds, and said copolymer contains about 50% by weight butyl acrylate and about 50% by weight methyl acrylate.

5. A composition as defined in claim 1 wherein said cellulose ester is cellulose acetate propionate containing about 48% by weight propionyl, having a hydroxyl content of about 2% by weight, and having a falling ball viscosity of about 20 seconds, and said copolymer contains about 45% by weight butyl acrylate and about 55% by weight methyl acrylate.

6. A composition as defined in claim 2 wherein said blend comprises from about 10 to about 15 parts per hundred parts resin of said copolymer.

7. A composition as defined in claim 3 wherein said blend comprises from about 10 to about 15 parts per hundred parts resin of said copolymer.

8. A composition as defined in claim 4 wherein said blend comprises from about 10 to about 15 parts per hundred parts resin of said copolymer.

9. A composition as defined in claim 5 wherein said blend comprises from about 10 to about 15 parts per hundred parts resin of said copolymer.

* * * * *